(12) United States Patent
Wight et al.

(10) Patent No.: US 8,257,148 B1
(45) Date of Patent: Sep. 4, 2012

(54) KNIFE INSERT WITH BOTTOM EDGE RELIEF FOR CUTTING EDGE ALIGNMENT

(75) Inventors: E. William Wight, Roscoe, IL (US); Christopher E. Albrecht, Cambridge, WI (US)

(73) Assignee: Reliance Controls Corporation, Racine, WI (US)

( * ) Notice: Subject to any disclaimer, the term of this patent is extended or adjusted under 35 U.S.C. 154(b) by 677 days.

(21) Appl. No.: 12/348,983

(22) Filed: Jan. 6, 2009

(51) Int. Cl.
*B26B 9/00* (2006.01)

(52) U.S. Cl. ............. 451/45; 30/349; 30/43.4; 30/43.6; 30/329; 30/337; 83/703

(58) Field of Classification Search ............. 30/349, 30/43.4–43.6, 329, 337, 340, 342; 83/703, 83/591, 592, 675, 698.41; 241/82.1–82.7; 451/45
See application file for complete search history.

(56) References Cited

U.S. PATENT DOCUMENTS

| | | | | |
|---|---|---|---|---|
| 492,452 A * | 2/1893 | Wright | | 30/120 |
| 946,441 A * | 1/1910 | Isaacson | | 30/267 |
| 1,015,403 A | 1/1912 | Schaarschmidt | | |
| 1,110,181 A * | 9/1914 | Bitz | | 30/349 |
| 1,615,882 A * | 2/1927 | Luedtke | | 30/349 |
| 1,975,284 A * | 10/1934 | Oppenheimer | | 451/45 |
| 2,729,889 A * | 1/1956 | Trinski | | 30/286 |
| 2,869,311 A * | 1/1959 | Beeston, Jr. | | 56/295 |
| 2,895,217 A * | 7/1959 | Fisher | | 30/169 |
| 3,570,355 A * | 3/1971 | Spengler | | 83/663 |
| 3,772,955 A * | 11/1973 | Pearl | | 83/746 |
| 3,847,360 A | 11/1974 | Seydelmann | | |
| 4,180,212 A * | 12/1979 | Witte | | 241/89.4 |
| 4,467,970 A | 8/1984 | Sagemuller | | |
| 4,660,778 A | 4/1987 | Fischer et al. | | |
| 5,054,698 A | 10/1991 | Schnell | | |
| 5,092,528 A | 3/1992 | Rudibaugh | | |
| 5,791,570 A | 8/1998 | Quadrana | | |
| 5,944,267 A | 8/1999 | Haack et al. | | |
| 6,029,917 A | 2/2000 | Jensen | | |
| 6,076,754 A | 6/2000 | Kesig et al. | | |
| 6,168,101 B1 | 1/2001 | Xie | | |
| 2004/0045167 A1 * | 3/2004 | Gringer et al. | | 30/125 |

FOREIGN PATENT DOCUMENTS

| | | |
|---|---|---|
| DE | 515085 | 12/1930 |
| SU | 1570768 | 6/1990 |

* cited by examiner

*Primary Examiner* — George Nguyen
(74) *Attorney, Agent, or Firm* — Boyle Fredrickson, S.C.

(57) ABSTRACT

A grinding head of a grinder is provided with a knife assembly that includes a knife holder with a number of arms, each having a knife insert slot, for receiving a matching number of knife inserts. The knife inserts have a blade or cutting edge and a bottom edge. The bottom edge, rather than being a straight edge, is shaped to define a pair of bearing portions that fit within the slot of the knife holder arm and allow the knife insert to be firmly retained in the slot. A recessed area is located between the bearing portions. The recessed area accommodates any imperfections in the floor of the insert slot, and provides a void area within which any material contained within the slot can be received when the knife insert is engaged within the slot.

6 Claims, 3 Drawing Sheets

KNIFE INSERT WITH BOTTOM EDGE RELIEF FOR CUTTING EDGE ALIGNMENT

FIELD OF THE INVENTION

The present invention relates to a knife blade or insert for use with a knife holder in a grinding head of a grinding machine, and more particularly, relates to an improved design for such a knife insert that increases productivity in the grinding process, ensures proper seating of the knife insert relative to the knife holder, and reduces wear on the knife insert, and reduces wear on parts that come into contact with the knife insert.

DISCUSSION OF THE RELATED ART

Typically, a grinding machine has a hopper into which the material to be ground is placed, a grinder portion for advancing and grinding material placed in the hopper, and a downstream collection apparatus. Within the grinding portion is a grinding head that includes a knife assembly mounted adjacent an orifice plate. Material that is advanced into the grinding head toward the orifice plate is sheared by the knife assembly acting against the orifice plate. The knife assembly includes a knife holder and knife inserts, each of which is mounted within a slot formed in a radial arm of the knife holder. The knife holder holds the knife inserts so that the cutting edges of the knife inserts lay flat against the orifice plate and the knife inserts can perform the shearing action against the orifice plate upon rotation of the knife assembly.

Due to the wear of the knife inserts against the orifice plate, the knife inserts need to be replaced with regularity. In addition, the entire grinding head must be disassembled and reassembled frequently for cleaning, including removing and replacing the knife inserts in the knife holder. However, when a knife insert is not properly seated in the knife holder, such as due to the presence of material in the knife insert slot or because the insert has been manufactured with an imperfection or the knife holder has acquired an imperfection, the knife insert can bow and its cutting edge does not lay flat against the orifice plate. The result of a bowed knife insert in the knife holder is twofold: (1) the knife insert and the orifice plate wear excessively at the bowed portion of the cutting edge, and (2) until the cutting edge wears down to lay flat against the orifice plate, the shearing ability of the knife edge is reduced and the finished product is of poorer quality than a properly aligned insert can produce.

The costs related to an improperly seated knife insert can be significant, including the costs of replacing parts more frequently and of generating lower quality product until the blade wears into proper alignment. Thus, in the food grinding industry, rapid and accurate replacement of knife inserts in a knife holder of a grinder head is valued.

BACKGROUND OF THE INVENTION

Previous attempts to address the problem of improperly seated knife inserts have been directed to preventing imperfections from occurring in the manufacture of the knife inserts and preventing conditions which lead to imperfections in the knife holder. However, these solutions require intensive quality control, leading to additional expense. What is needed is a knife insert with a cutting edge that lies properly against the orifice plate, even when imperfections are present on the insert or the knife holder.

The present invention contemplates modifications to a knife assembly that allows a knife insert to be placed in a knife holder slot in a manner that ensures that the cutting edge of the knife insert will lay flat against the orifice plate. The present invention allows improper positioning of the knife insert to occur in such a way that the cutting edge of the knife insert can still work effectively in concert with the orifice plate.

SUMMARY OF THE INVENTION

In one preferred embodiment of the invention, a grinding head of a grinder is provided with a knife assembly. The knife assembly includes a knife holder with a number of arms, each having a knife insert slot, for receiving a matching number of knife inserts. The knife inserts have a blade or cutting edge and a bottom edge. However, the bottom edge, rather than being a straight edge, is shaped to define a pair of bearing portions that fit within the slots of the knife holder arms and allow the knife inserts to be firmly retained in the slots. A recessed area is located between the bearing portions. The recessed area accommodates any imperfections in the floor of the insert slot, and provides a void area within which any material contained within the slot is received when the knife insert is engaged within the slot.

Various other features, objects and advantages of the present invention will be made apparent from the following detailed description taken together with the drawings, which together disclose the best mode presently contemplated of carrying out the invention.

BRIEF DESCRIPTION OF THE DRAWINGS

Preferred exemplary embodiments of the invention are illustrated in the accompanying drawings, in which like reference numerals represent like parts throughout, and in which:

FIG. 4 is a cross sectional view similar to FIG. 2 showing another embodiment of a knife insert in accordance with the present invention.

DETAILED DESCRIPTION OF THE PREFERRED EMBODIMENTS

Figure 1:
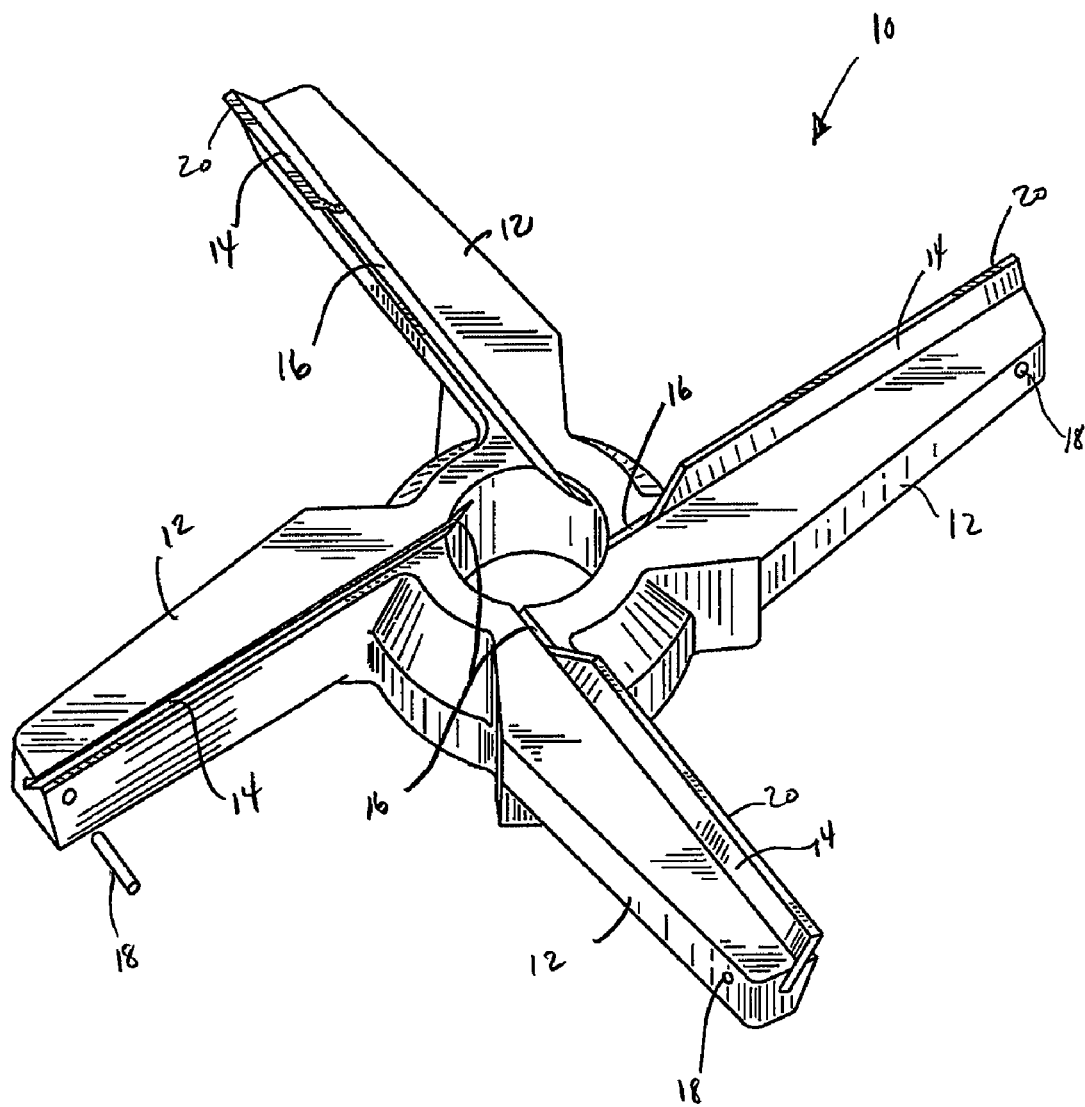
FIG. 1 is an isometric view of a knife assembly for use in a grinder, which includes a knife holder and a series of knife inserts in accordance with the present invention, each of which is seated in a knife holder slot formed in one of the arms of the knife holder.
Figure 2:
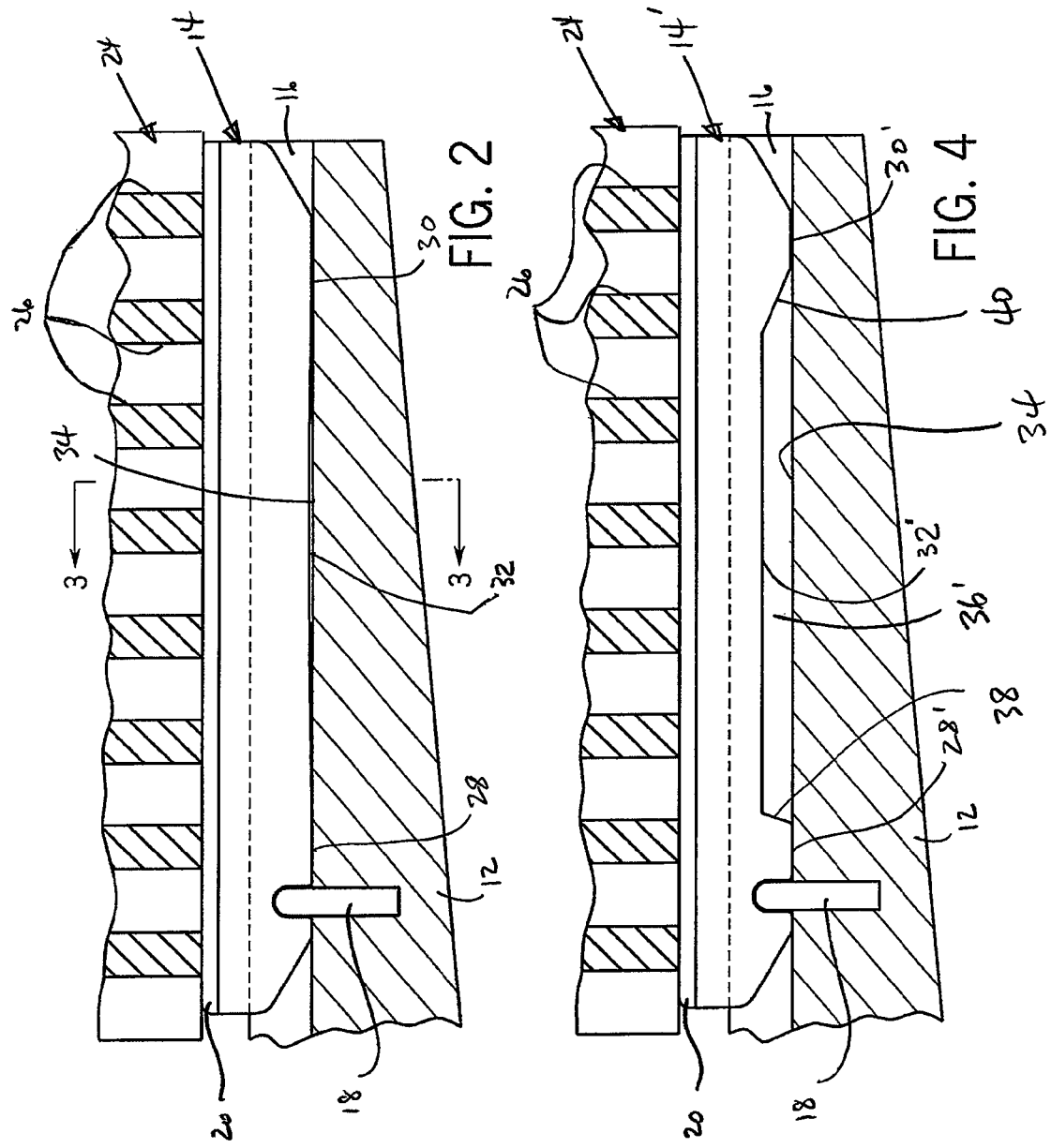
FIG. 2 is a longitudinal sectional view of one arm of the knife holder of FIG. 1, shown in combination with a portion of an orifice plate with which the knife assembly is adapted to be used.

A grinding machine (not shown), which is typically used for grinding foodstuffs or other materials, such as meat, generally comprises a grinding portion that includes a knife holder 10 having arms 12 bearing knife inserts 14, as shown in FIG. 1. Each knife insert 14 is mounted in a knife holder slot 16 formed in one of the arms 12, and is fixed in place via a pin 18. As seen in FIG. 2, each knife insert 14 is formed to include a shearing face or blade portion 20 and a bottom edge or face 22 that is seated in knife holder slot 16. An orifice plate 24 having orifices 26, also seen in FIGS. 2 and 4, is positioned adjacent the blade portion 20 of knife inserts 14. In a manner as is known, the blade portions 20 of knife inserts 14 cooperate with the surface of orifice plate 24 adjacent the orifices 26 to shear the material as it is being advanced toward orifice plate 24 and through orifices 26. The relationship between blade portion 20 and orifice plate 24 is also clearly shown in FIG. 3.

Returning to FIG. 2, bottom face 22 of knife insert 14 has an inner bearing portion 28 and an outer bearing portion 30 between which an upwardly arcuate or concave lower edge 32 extends. In the embodiment of FIG. 2, lower edge 32 is formed with a radius of approximately 12 to 36 inches, although it is understood that lower edge 32 may have any other desired configuration. The knife holder slot 16 is formed to include a flat bottom wall 34, such that a void area or gap 36 is defined between lower edge 32 and bottom wall 34 between inner bearing portion 28 and outer bearing portion 30. In one embodiment of the invention, knife insert 14 is 5 inches long and recess 32 is approximately 2.75 inches long, such that recess 32 extends throughout a majority of the length of the knife insert 14.

Figure 3:
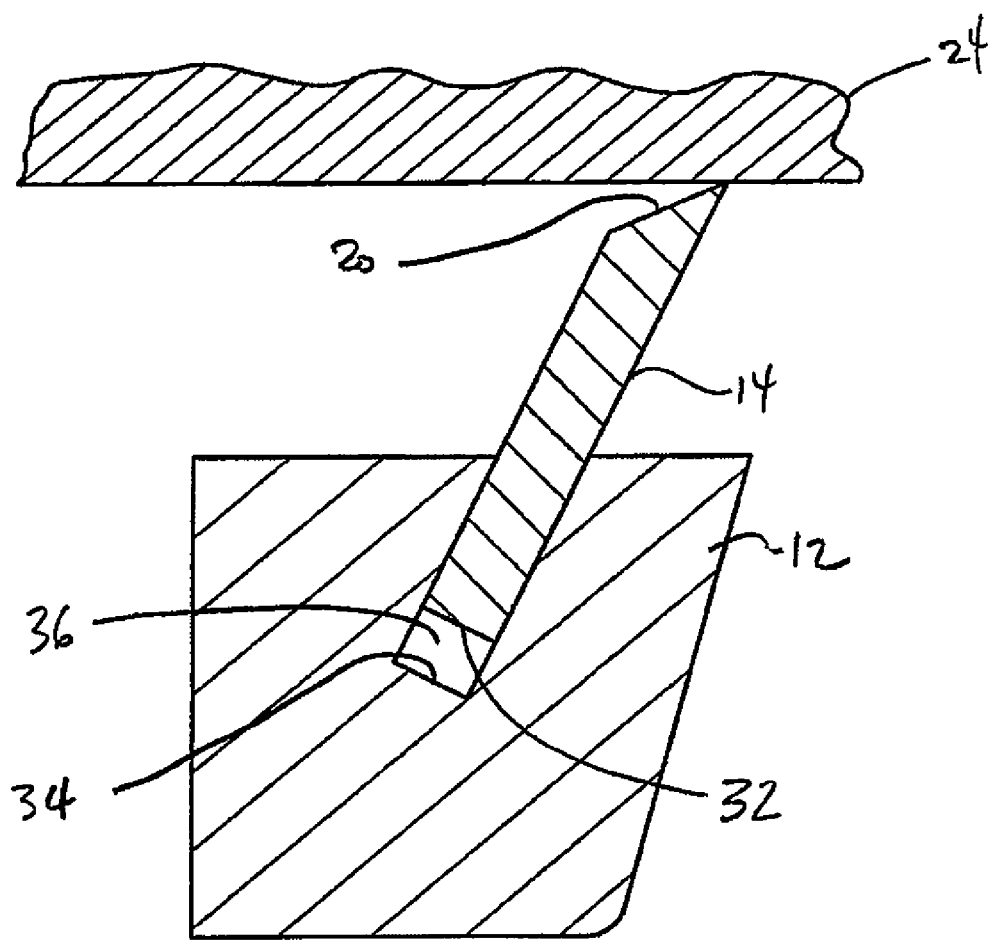
FIG. 3 is a transverse sectional view of the knife holder, knife insert, and orifice plate taken along line 3-3 of FIG. 2.

FIG. 4 shows another embodiment of the present invention, in which a knife holder 14' is provided with a recess 32' located between inner bearing portion 28' and outer bearing portion 30'. In this embodiment, the lower face of insert 14' is formed to include an inner shoulder 38 that extends upwardly from inner bearing portion 28', and an outer shoulder 40 that extends upwardly from outer bearing portion 30'. The lower edge of knife insert 14', shown at 32', extends between inner shoulder 38 and outer shoulder 40. Lower edge 32' extends generally parallel to bottom wall 34 of slot 16. In this configuration, the construction of knife insert 14' provides a significantly greater void area or gap 36' between lower edge 32' and bottom wall 34 than that provided by lower edge 32 of knife insert 14 as shown in FIGS. 3 and 4.

In Use and Operation

An operator of a grinding machine disassembles and reassembles the various parts of the grinding machine regularly. In disassembly of the grinding portion, orifice plate 24 is removed to access knife holder 10, which is likewise removed from the grinder. Knife inserts 14 are removed from knife holder slots 16 and the entire assembly is cleaned.

On reassembly, knife inserts 14 are replaced in knife holder slots 16 and orifice plate 24 is repositioned against knife holder 10 so that blade portions 20 of knife inserts 14 make contact with the face of orifice plate 24. Occasionally, a slightly bowed knife insert 14 or a knife insert 14 having an imperfectly formed lower edge, such as one including a burr or other slight projection, will be inserted into knife holder 10. Also occasionally, a small amount of material may be present in the knife holder slot 16 when the knife insert 14 is inserted into the slot 16. Normally, either circumstance would ordinarily cause blade portion 20 to be misaligned with the face of orifice plate 24. However, bearing portions 28, 30 allow insert 14 to seat firmly in slot 16 and support blade portion 20 against orifice plate 24, while the void area or gap 36, 36' accommodates any material that may be present in slot 16 and compensates for any irregularity in the manufacture of insert 14. Blade portion 20 is thus able to properly align with the face of orifice plate 24 and produce a high quality cut at start-up, despite the conditions that otherwise may cause the insert 14 to be misaligned with the surface of orifice plate 24.

In either reassembly situation described above, the bearing portions 28, 30, or 28', 30', which make up a minority of the length of bottom face 22, 22', respectively, are able to seat firmly in slot 16 such that the condition has no effect on the shearing engagement between blade portion 20 and orifice plate 24.

While the relief area in the bottom edge of the knife insert has been shown and described with respect to two distinct embodiments, it is understood that the knife insert bottom edge may have any desired configuration, as long as it provides two spaced apart bearing areas that engage the floor of the knife insert slot, in combination with a configuration that provides a recess or void area above the floor of the knife insert slot between the bearing areas. It is also understood that, while the slot floor has been shown and described as being flat, a slot floor having any satisfactory configuration may be employed.

Various alternatives and embodiments are contemplated as being within the scope of the following claims particularly pointing out and distinctly claiming the subject matter regarded as the invention.

We claim:

1. A knife assembly for a grinder comprising:
a knife holder having spaced-apart arms having outwardly open slots, wherein each slot is adapted to receive one of the knife inserts and is defined at least in part by a bottom surface; and
a plurality of knife inserts, each having a blade portion and a bottom face, wherein the bottom face of at least a first one of the knife inserts comprises a pair of spaced apart downwardly facing bearing portions and an upwardly extending recess between the bearing portions, wherein the upwardly extending recess is defined by a pair of end areas, each of which is located adjacent to one of the bearing portions and extends upwardly therefrom, in combination with a central area that is located between the spaced apart end areas, and wherein the pair of bearing portions of the first knife insert engage the bottom surface of the first slot and the upwardly extending recess is spaced from the bottom surface of the first slot between the bearing portions of the first knife insert and cooperates with the bottom surface of the first slot to define a void area between the bearing portions of the first knife insert, wherein the void area between the bottom surface of the first slot and the bottom face of the first knife insert is unoccupied when the first knife insert is positioned within the first slot.

2. The knife assembly of claim 1, wherein the bearing portions are generally coplanar and the upwardly extending recess in the bottom face of the first knife insert has a concave configuration between the bearing portions.

3. The knife assembly of claim 1, wherein the bearing portions are generally coplanar, and wherein each end area of the upwardly extending recess in the bottom face of the first knife insert comprises a shoulder adjacent each bearing portion, and wherein the central area of the recess comprises an elevated lower wall that extends between the shoulders.

4. The knife assembly of claim 1, wherein the first knife insert defines a length, and wherein the upwardly extending recess in the bottom face of the first knife insert has a length that extends throughout a majority of the length of the first knife insert.

5. A method of aligning a knife insert with an orifice plate of a grinding head in a grinding machine, wherein the grinding head includes a knife holder having one or more slots adapted to receive a plurality of knife inserts, comprising the steps of:
providing a plurality of knife inserts, wherein at least a first one of the knife inserts has a bottom face defining a pair of spaced apart downwardly facing bearing areas and an upwardly extending recess between the bearing portions, wherein the upwardly extending recess is defined by a pair of end areas, each of which is located adjacent to one of the bearing areas and extends upwardly therefrom, in combination with a central area that is located between the spaced apart end areas; and positioning the first knife insert within a first slot in the knife holder such that the bearing areas of the first knife insert engage a lower surface defined by the first slot and the upwardly extending recess of the first knife insert faces and is spaced above the lower surface defined by the first slot between the pair of spaced apart downwardly facing bearing areas of the first knife insert, wherein the upwardly extending recess of the first knife insert cooperates with the lower surface of the first slot to define a void area between the bearing areas of the first knife insert, wherein the void area is located between the lower surface of the first slot and the upwardly extending recess of the first knife insert and is unoccupied when the first knife insert is positioned within the first slot.

6. The method of claim 5, further comprising the step of positioning the knife holder such that a cutting edge defined by the first knife insert engages a surface of an orifice plate, wherein the upwardly extending recess of the first knife insert provides a relief for ensuring contact between the cutting edge of the first knife insert and the surface of the orifice plate.

* * * * *

UNITED STATES PATENT AND TRADEMARK OFFICE
CERTIFICATE OF CORRECTION

PATENT NO. : 8,257,148 B1  
APPLICATION NO. : 12/348983  
DATED : September 4, 2012  
INVENTOR(S) : E. William Wight et al.

Page 1 of 1

It is certified that error appears in the above-identified patent and that said Letters Patent is hereby corrected as shown below:

ON THE TITLE PAGE:

Item (73) Assignee should read:

-- Weiler and Company, Inc., Whitewater, WI (US) --

Signed and Sealed this
Fourth Day of June, 2013

Teresa Stanek Rea
*Acting Director of the United States Patent and Trademark Office*